July 16, 1946. E. ROBERTS Re 22,772

CENTRIFUGAL APPARATUS

Original Filed June 23, 1934 2 Sheets-Sheet 1

Inventor:
EUGENE ROBERTS
By Hammond & Littell
Attorneys

July 16, 1946. E. ROBERTS Re 22,772
CENTRIFUGAL APPARATUS
Original Filed June 23, 1934 2 Sheets-Sheet 2
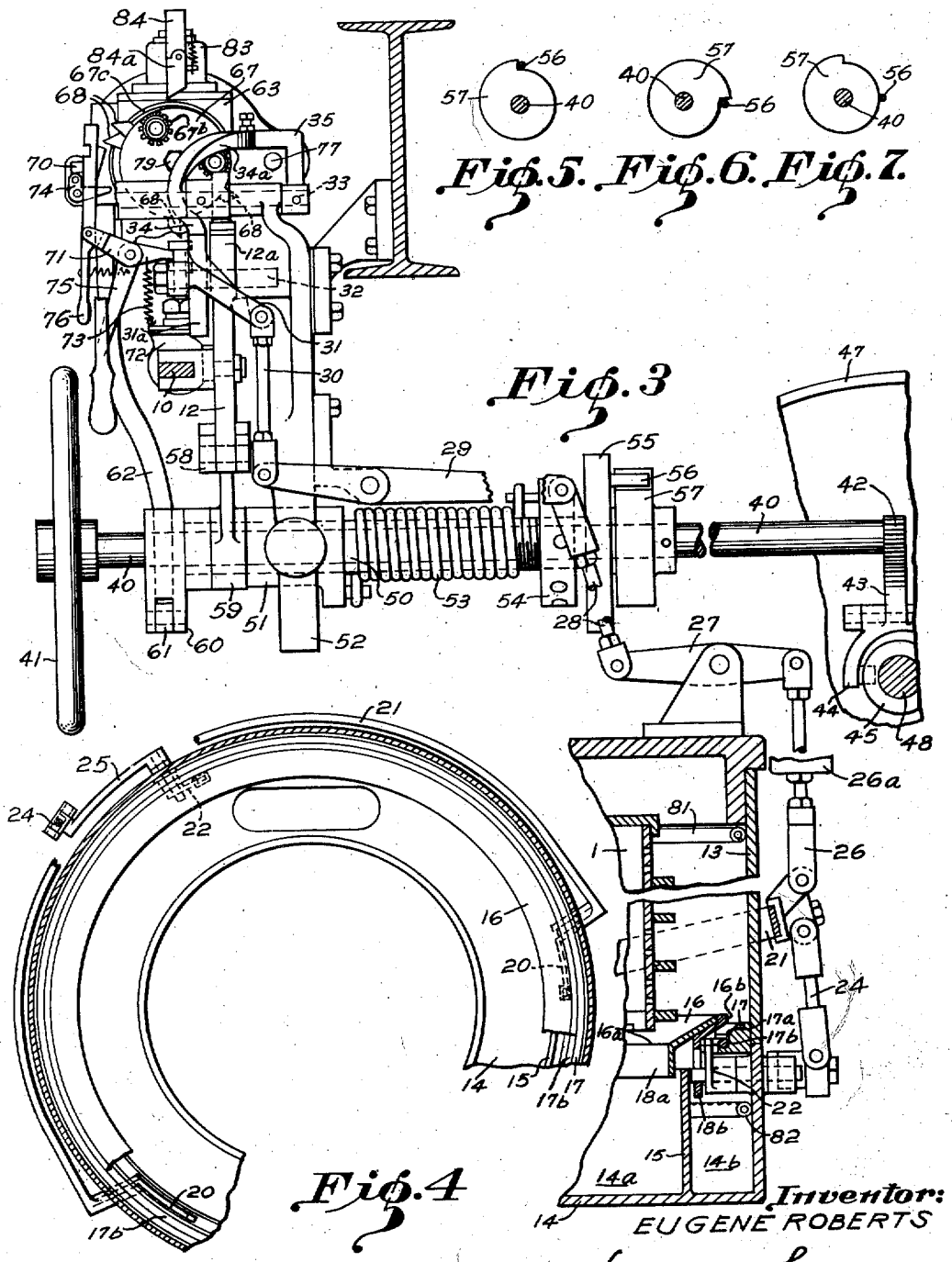
Inventor:
EUGENE ROBERTS
By Hammond & Littell
Attorneys Reissued July 16, 1946

Re. 22,772

UNITED STATES PATENT OFFICE 22,772

CENTRIFUGAL APPARATUS

Eugene Roberts, Hastings, N. Y., assignor to The Western States Machine Company, Salt Lake City, Utah, a corporation of Utah Original No. 2,145,633, dated January 31, 1939, Serial No. 732,114, June 23, 1934. Application for reissue June 30, 1945, Serial No. 602,605

18 Claims. (Cl. 210—67)

This invention relates to the control of centrifugal apparatus, particularly of the type used in sugar mills and refineries, and is intended to provide a simple, effective apparatus by which the operation of such centrifugals may be rendered more efficient while operating on a shorter cycle and at the same time reducing or eliminating waste of valuable material.

In my Letters Patent of the United States No. 1,719,132 dated July 2, 1929, and No. 1,861,978 dated June 7, 1932, there were disclosed certain improvements or modifications of the invention that was described in reference to a belt-driven sugar centrifugal and was claimed basically in my Letters Patent No. 1,758,901 dated May 13, 1930. Those patents each disclosed a suspended gyratory sugar centrifugal machine having driving means and a self-setting brake combined with manually operated starting means, an adjustable automatic rotary timing control and interconnected sugar washing apparatus. The forms illustrated in said improvement patents were adapted particularly to be driven by a directly connected electric motor. The timing mechanism of each patent was organized so that the throwing of the centrifugal starting lever to full speed position, after it had been moved to jog or low speed position to facilitate unloading or loading the centrifugal basket, acted to start the machine on an automatically controlled and adjustably timed phase of its cycle of operations, including broadly, first, the purging, second, spraying or washing and, third, the drying and the stopping preparatory to unloading at low speed.

One of the principal objects of my present invention is to provide improved means permitting separate collection of different liquids expelled from a centrifugal during an operating cycle, and particularly, in the use of the apparatus in the manufacture of sugar, to enable a sharp separation between the green liquor or other syrup of relatively low purity purged from each charge of sugar massecuite or magma and the wash syrup produced by applying washing liquid to sugar remaining in the centrifugal after a part of the spinning cycle.

Another object of the invention is to provide automatic control means for ensuring operation of the aforesaid syrup separating means at the proper stage of every centrifuging cycle and thereby further facilitating sharp separation of different liquids received on the curb as well as otherwise rendering centrifugal treatments more efficient.

A further improvement effected by this invention resides in the provision of improved means allowing driving controls for a belt-driven centrifugal or the like to be energized and de-energized while the brake is held in an "off" position, in order to permit an operator by easy manual control of the machine to cause rotation of the basket at low speeds suited for the discharging and the re-loading of the basket, and also in the provision of means allowing the operator to wash the basket after each unloading operation, thereby preventing the smearing of the outlet passages and maintaining the centrifugal at its full efficiency.

These and other features of the invention will be described in the following specification and will be defined in the claims hereto annexed.

In the accompanying drawings there is illustrated a control apparatus associated with centrifugal apparatus embodying a practical application of the principles of this invention, in which—

Fig. 3 is a side elevation of the assemblage shown in Fig. 1, centrifugal suspension means being omitted.

Fig. 4 is a horizontal sectional plan of the surrounding curb or casing of the centrifugal, showing illustrative means for raising and dropping the syrup deflecting ring.

Figs. 5, 6 and 7 are diagrammatic views illustrating, respectively, the position of the shipper shaft cam and the brake actuating pin in the three successive positions in which the driving clutch is out and the brake is on; the driving clutch is in and the brake is off; and the driving clutch is out and the brake is off.

Figures 1, 2:
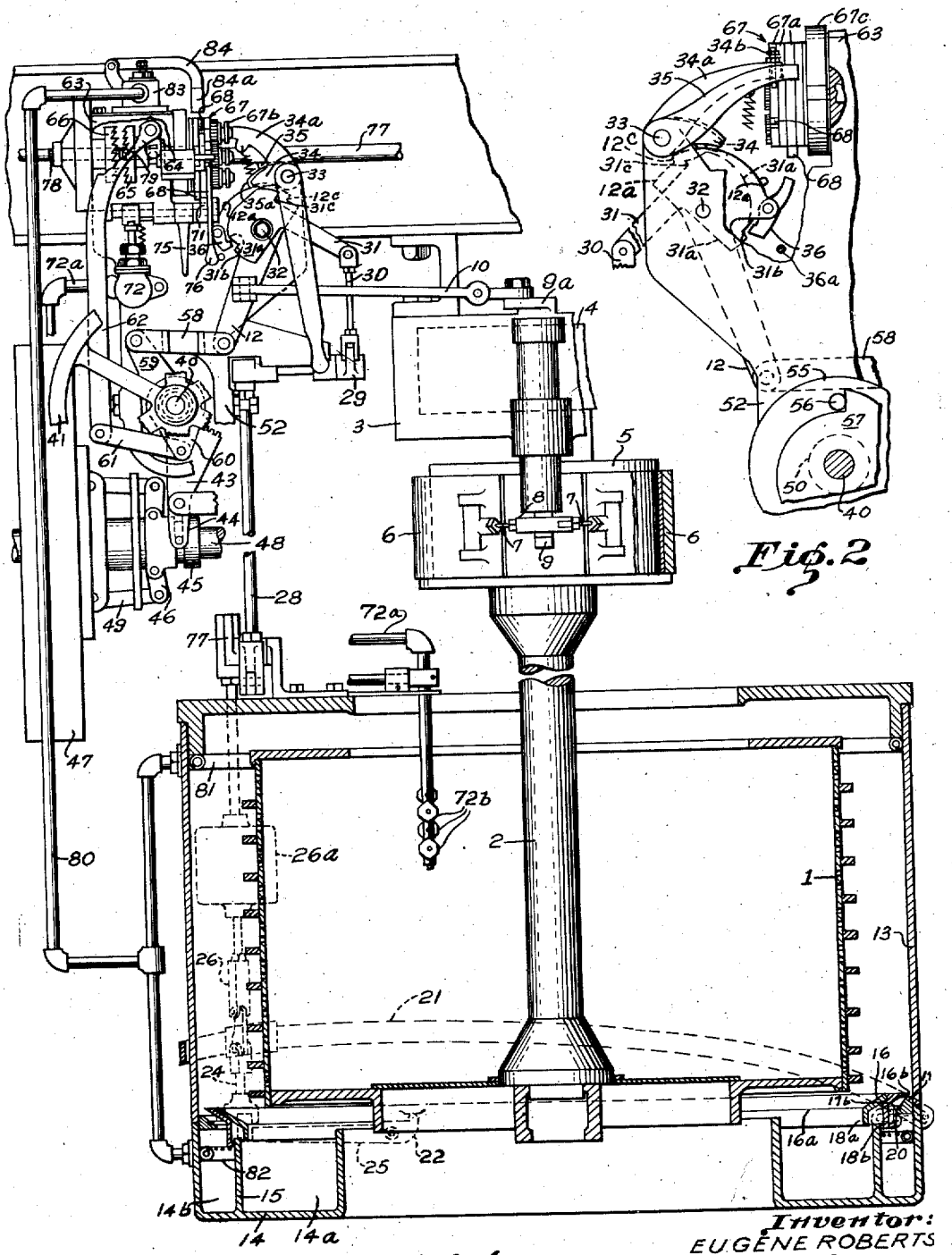
Fig. 1 is a front elevation showing one form of the improved control mechanism and one form of the new syrup separator associated with a suspended centrifugal the basket and curb of which are shown in vertical section in order to expose the interior construction.
Fig. 2 is a detail view illustrating in rear elevation the relation of parts of the brake and syrup separator actuating mechanisms to the automatic timer.

The cycle of sugar centrifugal operations embracing the purging, washing and drying is now so short that there is not time for the centrifuged syrup impinging against the casing wall to flow down the sides and around the bottom trough of the curb to the usual outlet nozzle quickly enough to avoid allowing a considerable portion of it to escape into the wash syrup conduit, if attempt is made to separate the syrups by means outside the curb. To hasten the escape of syrup into the syrup collecting conduit and to avoid undesirable intermingling of wash syrup with green liquor or other relatively impure syrup, I have provided a simple structure utilizing a shiftable ring element inside the curb to be moved at appropriate intervals relative to a circular seat on the curb wall and yet to stay in a sealed relation to a circular partition which divides the curb bottom into two separate syrup-collecting conduits or troughs. I also have provided a centrifugal organization so combining this structure with other elements that the separation of wash syrup from green syrup may be effected automatically in every operating cycle at an interval properly determined in relation to the purging, washing and drying phases of the cycle. Further, I have hastened the flow of syrups to the point of separation by providing mechanism under the control of the timer for directing an annular series of fluid jets against the inside wall of the curb to give a scouring effect and quickly expel adherent syrup into an appropriate syrup collecting trough; and I also have made provision for cleansing the seat of the deflector ring element at the same time so as to avoid sticking which would follow from the accumulation of the sticky liquid around the seat. Provision is also made for momentarily washing the basket, after discharging the sugar treated in each cycle, without interfering with the normal functioning of the automatically controlled spraying apparatus.

These improvements of my present invention are illustrated herein as applied in practice to a belt-driven centrifugal, in which the gyratory centrifugal basket 1, having the usual perforated wall and interior filter linings (not shown), is secured to the lower end of a rotary shaft 2 suspended according to well known practice in a fixed suspension hanger 3 to permit gyration against yielding centralizing resistance. Belt pulley 4 is secured to the upper end portion of the shaft to lie in the plane of the center of gyration, and below the belt pulley there is secured to the shaft a brake pulley 5 surrounded by opposing friction brake bands 6, whose free ends are interconnected by links 7 with a revoluble head 8 secured to a vertical rock spindle 9, whose upper end is provided with a crank shaft 9a connected by pivotal links 10 with a brake actuating lever 12, whose hub portion, pivoted upon the stub shaft 32, is enlarged to form a cam-like disc or head 12a having a shoulder 12c on one portion thereof and carrying a pivotal latch 36 on another or lower portion.

The starting of the centrifugal is effected by the operator by means of a hand wheel 41, fast on the shipper shaft 40, to whose rear end is secured a pinion 42 meshing with a sector gear lever 43 fulcrumed intermediate of its ends and having a lower arm in the form of a fork or clevis 44 engaging an annular groove in a sleeve 45 slidably mounted on the horizontal line shaft 48. A clutch pulley 47 is revolubly mounted on shaft 48 and is frictionally engaged by centrifugal clutch shoes (not shown) which are retracted to inactive position by retracting levers 49, whose outer ends are forced to shoe-retracting position by toggle links 46 pivotally connected with the slidable muff or sleeve 45. Such a clutch is illustrated in my United States Letters Patent No. 1,884,873.

Rotation of the shipper shaft 40 clockwise acts to flex the toggles 46 and allow the clutch shoes, through centrifugal force, to form driving engagement with the pulley 47, which pulley has driving connection with pulley 4 of the centrifugal by the usual quarter-turn belt.

Control of the brake is provided by means of a rock sleeve 50, which is mounted for partial rotation in a fixed bearing box or member 51 carried by a hanger 52. A spring tensioning collar 54 is secured adjustably on the rear portion of the sleeve 50 and around the sleeve is placed a helical torsion spring 53, whose forward end is attached to an anchoring pin on the fixed bearing member 51 and whose rear end is held by a pin projecting from the adjustable tensioning nut 54. Beyond the rear of the sleeve 50 a cam-like member 57 is secured to the shipper shaft 40. The shoulder of said cam 57 is adapted to engage a pin 56 projecting from a disc or collar 55 secured to the sleeve 50, so that clockwise rotation of the shaft 40 tends, by the thrust of said shoulder, to wind said spring and increase the counter-clockwise torsional thrust of the spring.

The brake actuating arm 12 is connected by a pivotal link 58 with an arm 59 that is fast on the rock sleeve 50, so that clockwise rotation of the sleeve imparted by like rotation of disc 57, pin 56 and collar 55 shifts the brake actuating arm 12 to the right or counter-clockwise and will allow dog or detent 35a fast on rock shaft 33 to drop behind the shoulder 12c of the brake arm head 12a and hold the brake lever 12 against clockwise rotation that otherwise would be caused by torsion spring 53. An upwardly projecting arm 35 also fast on rock shaft 33 overhangs one of the timer cams 67a, hereinafter more particularly described, so that at the proper time in the timed phase of the cycle the dog 35a is lifted by a finger 68 on such timer cam, whereupon the brake lever returns to brake-on position by the force of the brake setting torsion spring 53 and the intermediate connections.

Between the sleeve 50 and shipper wheel 41 there is secured to the shipper shaft 40 an arm 60, which is connected by a pivotal link 61 with a clutch actuating lever 62 fulcrumed on the timer case or box 63 and secured to a clevis or clutch fork 64, which by clockwise rotation slides the intermittently driven clutch disc 65 into active engagement with the continuously rotating driving clutch member 66 fast on shaft 78 that has uninterrupted connection for slow rotation with the timer driving line shaft 77. When the timer clutch members 65 and 66 are thus engaged, the shaft 79 (Fig. 3) carrying a rotary timer head 67 is started on slow rotation at a constant speed. The timer head comprises a plurality of discs or cams 67a having radial fingers or projections 68 secured thereto, and the relative angular positions of the discs and their fingers on shaft 79 may be effected by the manipulation of knobs such as indicated at 67b. A clock spring 67c urges the timer head to a zero or starting position, as determined by suitable stops (not shown), whenever the timer clutch members 65 and 66 are disengaged. When these members are engaged the head is driven slowly in a counter-clockwise direction (Fig. 3) against the tension of spring 67c, with the result that the several fingers 68 are brought successfully, after predetermined intervals of timer operation that depend upon their respective settings, into engagement with cooperating detents or targets located in their respective paths on parts 69, 34a, 74 and 45, respectively, all for purposes hereinafter more particularly described. Details of such an intermittently driven timer are disclosed in my earlier United States Patents Nos. 1,719,132 and 1,956,539 and need not be repeated further herein.

As disclosed herein and in my aforesaid Letters Patent, the throwing of the shipper or starting device, 41 herein, to normal driving position, at the completion of a manually controlled phase of operations for releasing the brake and driving or jogging the machine at low speeds suited for unloading the basket and reloading it to start another cycle of operation, effects the starting of the centrifugal on the purging period of its operating cycle and also acts, through link 61, lever 62, clevis 64 and timer clutch members 65 and 66 herein, to energize the rotary timer which controls the timing of the different operations of the centrifugal cycle. The revolving cams of the timer act at adjustably timed intervals after its energization, through the various projections or fingers such as shown at 68, to actuate the controlling connections. The sprayer cutoff valve at 72 has an upwardly projecting valve stem engaged with a rocker arm normally drawn downward by contractile spring 73 to keep the valve seated or closed. This rocker arm is lifted to open the valve by the downward movement of the connected oppositely projecting arm 71, which is pivotally connected with a notched latch 69 which is forced downward by one of the timer cam projections 68 until the notch interlocks with a stationary bar or lug 70, so that the valve remains open until another timer cam projection in the path of the releasing dog or angle latch 74 swings the latch 74 clockwise to throw the latch 69 out of interlocked engagement with the stop 70, thereby permitting the contractile spring 73 to instantly close the cutoff valve. For reasons presently to be described, the detent latch 69 is provided at its lower end with a handle 76 adapted to be grasped by the operator. Also the arm 71 is connected with a manual lever or handle 75 to permit opening the valve by hand.

It will be understood that the sprayer cutoff valve 72 is located across a fluid supply conduit 72ᵃ leading to a sprayer for directing wash fluid into the contents of the basket 1. The sprayer, which may be of any known type, is designated at 72ᵇ in Figure 1. When valve 72 is opened by movement of the timer mechanism, wash fluid is immediately sprayed into the basket 1, and the spray is cut off when the valve is closed. The apparatus of this invention is constructed so that actuation of the sprayer may be regulated to take effect automatically in any desired timed relation to the starting and stopping of the centrifugal and to the actuation of the syrup separator and washdown jets, to be described more specifically hereinafter.

It is desirable, when processing certain types of sugar-syrup mixtures, that the green syrup extracted from the wet sugar during the purging step of every cycle be as completely as possible separated from the wash syrup which results from the spraying of a washing liquid against the interior of the walled up sugar and is expelled centrifugally against the surrounding curb or casing 13. In the processing of some grades of sugar-syrup mixtures, for example in the so-called "affination" stage of cane sugar refining, it is extremely important to be able to collect an accurately regulated amount of the wash syrup with the green syrup and to collect the remainder of the wash syrup separately so that the different types of syrups or mixtures of syrups may be used subsequently in the manner best adapted to their particular qualities.

To permit the attainment of these objectives I have provided an arrangement for directly diverting a selected type of syrup, such as green liquor, from the entire circumference of the curb into an annular syrup collecting trough inside the curb, while making provision for shifting a syrup deflector to idle or inactive position where it allows further liquid received on the curb wall, such as wash syrup, to flow directly into another, separate, circumferential collecting trough, the arrangement being such that it avoids intermingling of the two types of syrup and such that it will continue in effective operation through cycle after cycle under the adverse conditions occasioned by the stickiness and crystallization of the syrups and by the intense windage produced inside the curb during the high speed rotation of the centrifugal basket in each cycle.

To hasten the flow of syrup from the curb wall into these collecting troughs, I have also made provision for an annular series of scouring jets, such as steam jets, which are directed downward against the inside wall of the curb to more rapidly expel the sticky syrup and to accelerate its movement by the action of heat. I have also provided means for directing cleansing steam jets against the deflecting ring so as to keep it clean and prevent the sticking of the deflecting ring to its seat.

I will now describe the mechanism of the deflector ring and its timed actuating control as illustrated in the accompanying drawings, it being understood of course that the practical embodiment of the invention is not restricted to the described details of construction.

The annular trough-like bottom 14 of the curb 13 is provided with a vertical circular partition 15 dividing the curb bottom into separate inner and outer annular troughs 14ᵃ and 14ᵇ, respectively, for the reception of different syrups to be collected separately. Above this partition 15 is disposed a vertically movable deflector ring 16, which has an inner portion 16ᵃ overlying the dividing partition 15, and hence the inner trough, and has also an outer portion or periphery 16ᵇ to engage and form a syrup-tight seal in one position of the ring with an annular ledge or seat 17 located on the inside wall of the curb at a level below the syrup outlets or perforations of the basket 1 and somewhat above the top of the dividing partition 15.

The inner portion of the deflector ring not only overlies the top of partition 15 but overlaps it at all times, in any position of the ring, so as to maintain a sealed relationship causing liquid on the face of the ring to be conducted into the inner trough and preventing the passage of liquid, under the force of windage inside the curb or otherwise, between the ring and the partition from one to the other of the two syrup troughs 14ᵃ and 14ᵇ. In the illustrated form, the inner portion of the ring comprises downward annularly spaced projections or flanges 18ᵃ and 18ᵇ which straddle the top of the partition for a short distance sufficient to maintain this sealed relationship. Whether the deflector ring is seated or unseated, i. e., whether its outer periphery 16ᵇ is sealed against or spaced away from the ledge 17, its inner portion continues to overlap the top portion of the partition, as appears from Fig. 1 and Fig. 3 of the drawings.

Obviously when the deflector ring is dropped upon the annular seat member 17 all liquid flowing down the inner face of the wall of the curb will be deflected into the inner liquid collecting trough, while on the other hand when the deflector ring 16 is separated from the seat member only a very short distance, as by raising it, the liquid flowing down inside the curb wall will run into the outer collecting trough.

Since the ring stays sealed with the partition 15 and yet is movable to and away from a position of sealing engagement with member 17, it serves in effect as a ring valve with respect to the outer trough 14b. The seat member 17 and the ring 16 in its relation to the partition normally form an uninterrupted syrup-conducting surface or platform from the curb wall to the inner trough, which surface completely seals off the outer trough and is interruptible only at the seat on the curb, to provide a single annular space between it and the outer periphery of the ring, through the unseating of the ring. The circular line of syrup separation so provided at the ledge 17 is everywhere equidistant from the curb surface that receives syrup expelled from the basket, and any syrup flowing from the curb over this circular line has a certain and invariable destination, depending upon the position of the ring deflector. If it is seated so as to seal at its outer edge the syrup must pass onto the face of the ring, and the only possible destination of syrup received on the face of the ring is the inner trough 14a because there is always a surface to conduct it there. Further, the ring 16 is inclined at an angle to the horizontal path of rotation of the basket 1, and this inclination enhances the flow of green syrup into the inner trough. If the ring is unseated, however, the syrup then flowing from the curb wall has free access to and is entrapped into the outer trough, to which it passes over the seat member 17 through the space then existing between it and the ring. Syrup that has passed the seat in either condition of the structure is conducted directly to its appropriate trough and stays there until drawn off, without diversion into the inappropriate trough by the windage of the machine or otherwise.

Since the only seal to be made when reseating the ring is at one circular seat on the curb wall that is subject uniformly to the action of liquid flowing thereover from the curb wall, a syrup-tight surface leading to the inner trough can be re-established upon each reseating of the deflector ring in the use of my invention, without requiring too costly or unattainable precision in the manufacture of the sealing parts and notwithstanding the tendency of sugar syrups to congeal or crystallize on parts of the structure under the conditions of operation of sugar centrifugals. As appears in Figs. 1, 3 and 4 of the drawings, the seat member or ledge 17 of the illustrated embodiment is formed with a circular groove or channel 17a holding a circular tubular member 17b of flexible material such as rubber or the like. This flexible member is located so as to be engaged by the outer periphery 16b of the ring when the ring is seated, in which condition it supports the weight of the ring. This is effective to secure the requisite syrup-tight seal upon each seating of the ring even when adhesions of syrup or crystallized sugar occur.

As appears further from the following detailed description and from the drawings in illustration thereof, suitable actuating mechanism is extended into the curb bottom to engage the deflector ring and move it to its seated and unseated positions at appropriate stages in the successive cycles of the centrifugal machine. This actuating mechanism is associated with the centrifugal control combination so as to make the syrup separator function as an element of that combination in properly timed coordination with its manually and automatically controlled phases of operation. In particular, as explained more fully hereinafter, the actuating mechanism for the syrup separator is connected with the manually operated means provided for releasing or unseating the brake of the machine so that movements of the latter which place the brake at "off" or "unset" position at the end of each centrifugal operation, usually in preparation for unloading and thereafter reloading the basket, will cause movement of the deflector ring 16 to its seated position; and said actuating mechanism is associated also with an adjustable rotary timer element coordinated with those of my control combination so that a movement induced by this timer element at a predetermined interval in the course of each centrifugal operation, usually a considerable time after the start of the washing phase of the operation, will cause movement of the deflector ring 16 away from ledge 17 to the unseated position. The syrup separator therefore delivers into the inner trough 14a all molasses or green syrup discharged from the basket 1 during the purging period of each cycle or during the loading period that precedes purging, until the timer element acts to cause a shifting of the ring to its unseated position for the collection of wash syrup separately in the outer trough 14b. Such separate collection of wash syrup then proceeds during the washing and drying periods which follow, until after the stopping or slowing down of the machine.

At three points around the circumference of the curb there are pivotally mounted three lifting paws or fingers 20, 20 and 22. The paws 20 are connected by a semiannular bail or lever 21, which is pivotally connected with a vertical link 26 carrying an actuating weight 26a. The bail is also connected by pivotal link 24 with an arm 25 that is secured to the pivotal paw 22 on the opposite side of the pivotal axis, so that when the weight 26a depresses the link 26 the lever bail 21 and lever 25 are depressed, thereby causing the lifting of the fingers or paws 20, 22 and elevating the ring 16 from its seat to open the outer trough to the inflow of the wash liquor. During the purging operation of the machine the link 26 is kept in raised position with the deflector ring 16 resting closely upon the annular ledge or seat 17 in order to deflect the centrifuged syrup or green liquor into the inner trough. The link 26 is connected with the rocker lever 27 fulcrumed on the top of the curb, which lever in turn is connected by link 28 with another rock lever 29, whose farther end is connected by link 30 with a lever 31 which, during the purging operation, is in raised or horizontal position. The lever 31 is pivotally mounted on a stub shaft 32, which also forms a fulcral support for the brake lever 12, and the hub portion of said lever 31 is enlarged to form a cam-like disc 31a, having an upper shoulder 31c and a lower shoulder 31b, located directly in front of the brake lever cam head 12a which carries the latch 36.

When the lever 31 is in raised position, that is, horizontal according to the drawings, its upper shoulder 31c will be engaged by a dog or detent 34 loosely mounted on the shaft 33 and normally weighted or under spring tension to press against the periphery of the cam head 31a so as to drop behind the upper shoulder when lever 31 is in raised position. This dog 34 has an upward extension or arm 34a preferably provided at its outer end with an adjustable contact screw 34b for engagement by a rotary finger 68 on one of the timer cams 67a, which is set to lift the dog 34 at the proper time to free the head 31a of the lever 31 and allow the lever to drop under the gravity action of the weight 26a. The position at which the appropriate finger 68 engages and moves detent 34b is the timing-out position of the syrup separator timing element. The actuating cam element for lifting arm 34a in a counter-clockwise direction (as the arm is seen in Fig. 2) may be set or timed so that when the wash water valve 72 is opened, or at any appropriate stage of the operating cycle thereafter, the dog is released and the deflector ring actuating mechanism is allowed to operate to raise the ring to inactive or unseated position.

To drive liquid expelled from the basket and adhering against the curb wall into its appropriate collecting trough, I have arranged a source of fluid supply, steam for example, comprising a pipe 80, whose upper branch leads to a pipe ring 81 having underneath perforations at frequent intervals to direct jets of fluid downward and against the inside face of the curb 13 so that the scouring and washing action of the fluid, and both the heat and the scouring action when steam is used, tend to cause the adhering material to quickly pass down into an open trough. Another branch of the pipe 80 passes to an annular jet pipe 82 arranged below the ledge 17 to direct jets against the deflector ring 16 and thereby cleanse the deflector of adherent sticky syrup and prevent its sticking to the seat.

The pipe 80 leads from a valve chamber 83, which is connected with the source of fluid supply. Chamber 83 is here shown as mounted on the cover of the timer casing. An upwardly projecting valve stem is engaged with a pivoted arm 84, whose lower end 84a is positioned to lie in the path of movement of a swell or projection on one of the cams 67a, which is properly set to lift the arm 84 and open the valve in order to permit the flow of fluid through the jet pipes 81 and 82 at the proper point in the cycle, for example, before the wash water begins to spray against the inside of the walled up sugar in the basket 1. The scouring fluid may be applied after the wash syrup is centrifugally expelled against the inside of the curb, since it will act also to accelerate the flow of the wash syrup, thereby preventing the mingling of valuable wash syrup with green liquor of possibly low value from the next cycle, and to free the deflector ring and its seat from accumulations of sticky material. For almost continuous application of the fluid to the curb wall the swell or raised portion of the cam may be continued for such angular part of the cam circumference as may be found convenient.

Another new feature of improvement herein disclosed is that which permits the momentary washing of the basket itself after each unloading of the centrifugal. With sticky materials the filter linings and the basket openings are likely in time to become more or less clogged against the rapid escape of syrup or wash syrup. To obviate this trouble, which leads to inefficiency in maintaining rapid circulation of the liquids through the sugar, I provide manually controlled means associated with the automatic timer mechanism so that after the unloading of the basket the sprayer or wash water valve 72 may be momentarily opened to douche the interior of the basket lining and keep the passages through the filter lining and basket wall free from any obstruction. With this end in view I have provided a handle 75 within reach of the operator by which he can momentarily open the valve by lifting the rocker arm through the rearward movement of the handle and may then immediately release the latch 69 by pulling forward the handle 76, forming an extension of the latch 69, to release the latch against the tension of its retracting spring and allow the valve to instantly close. This momentary application of the spray by the operator does not in any way interfere with the proper action of the timing mechanism and does contribute very materially to keeping the filter linings and the basket free from obstruction.

After the brake dog 35a has been released from the shoulder 12c of the brake arm head 12a, the counter-clockwise thrust of the torsion spring 53 operates to set the brake and stop the machine, while at the same time the pin 56 carried ultimately by the brake sleeve 50 acts in a counter-clockwise direction to move the cam 57 and shipper shaft 40, which not only disengages the centrifugal drive by movement of parts 42, 43, 44 and 45 and the basket driving clutch, but also disconnects the driven clutch member 65 from the driving member 66, thus releasing the timer and allowing it to return to initial position under the influence of the return spring 67c, as disclosed also in my earlier patents. That is to say, Fig. 6 illustrates the position of the cam 57 on the shipper shaft 40 and the position of the thrust pin 56 on the disc 55 that is fast to the brake sleeve 50, when the hand wheel 41 has been turned in a clockwise direction to move these parts from the position shown in Fig. 5. In the Fig. 6 position the brake is off and both the driving clutch and the timer clutch are in, while Fig. 5 shows the relation of parts 56 and 57 when the brake is in and the clutches are out, which is the appropriate position to slow down the revolving centrifugal and stop it within a predetermined time interval that will depend on the tension to which torsion spring 53 is set. As the centrifugal slows down the brake may be unset and the discharger plow may then be operated by the attendant in the well known manner to unload the basket, but under some conditions the basket may stop before the unloading is performed. To meet all practical needs, provision is made to allow the operator to cause further rotation of the basket sufficient to effect the unloading and also, if desired, to effect the momentary washing of the basket and its filter lining above referred to prior to re-loading the basket, after which the re-loading may proceed while the basket is caused to rotate at an appropriate loading speed. Accordingly, after the braking stage of each cycle the operator can turn the hand wheel clockwise, thus unsetting the brake and allowing it to be locked in "off" position, as in Fig. 6, and after a brief interval sufficient to give a new rotative impulse to the basket by its driving clutch, the operator may shift the hand wheel counter-clockwise to move the basket driving clutch to "off" position corresponding to Fig. 7, while leaving the brake locked in "off" position. This action was not possible with the complete interlocking arrangement of the brake and clutch disclosed in my earlier forms of belt driven apparatus.

The resetting of the lever 31 to raised or horizontal position is effected by the brake lever head 12a acting through the medium of its attached pivotal latch 36, which acts when the brake lever head moves to brake-off position, that is, counter-clockwise, to engage the lower shoulder 31b of the disc 31a and rotate that disc counter-clockwise until the upper shoulder 31c of the disc is engaged by the dog 34. The latch 36 is overbalanced so that it is lower and tends to swing in toward the cam 31a, but the latch is released near the end of its downward travel by the engagement of its upper end with a fixed stop pin 36a (Fig. 2) so that the latch does not interfere with the dropping of the arm 31 when it is released for the purpose of permitting the actuating weight to cause the lifting of the deflector ring 16 from its seat.

It will therefore be seen that any desired separation of mother liquor or other relatively impure syrup from wash syrup may be efficiently controlled and performed without undesirable waste or mingling of the syrups, and also that provision is made for washing the basket and its filter linings almost instantaneously by providing suitable manual control by which the slow rotation of the basket may be prolonged and the wash water valve momentarily opened before or after the basket comes to a complete stop. The handle on the forward end of the rock shaft 33 makes it possible for the attendant to release the brake retaining dog 34a from the brake lever to permit the brake to return to active position immediately after the basket washing operation.

The great resulting advantages of the improvements herein disclosed include material savings in the waste heretofore incurred by intermingling green liquor and wash syrup, the maintenance of full efficiency of the basket and its filter linings by the provision for washing them after each complete cycle without appreciable loss of time, and the accomplishment of a more complete and satisfactory control over centrifugal operations.

The advantages stated in describing the use of the improved apparatus in sugar manufacture are also of importance in other fields, as will be apparent to persons skilled in the art. It will also be understood that the invention is capable of adaptation to various forms and types of centrifugal apparatus without departing from the principles of the disclosure and the requirements of the claims.

What I claim is:

1. Centrifugal apparatus for purging, washing and drying sugar or like material comprising in combination with suitable driving means and a self-setting brake having actuating means including means operative when active to set the brake with a predetermined force, a manually operable shipper mechanism associated with said brake actuating means and having actuating connections with the driving means such that forward movement of the shipper mechanism from an "off" position to a driving position engages said driving means and reverse movement thereof disengages said driving means, cooperating elements connected respectively with said brake actuating means and with said shipper mechanism whereby the latter is moved from its driving position to its "off" position as the brake is set and whereby the brake is moved from its "set" to its "off" position upon forward manual movement of the shipper mechanism from its "off" position, and means rendered operative as the brake is moved off for releasably holding said brake-setting means inactive, said cooperating elements constructed to be relatively movable while said holding means is operative so that said shipper mechanism then may be moved freely back and forth to disengage and reengage the driving means, whereby after the shipper mechanism is moved forward to unset the brake the brake is held off and the same shipper mechanism may be moved freely in effectuating the unloading, the washing out and the reloading of the centrifugal as desired.

2. In centrifugal apparatus for purging, washing and drying sugar or the like, the combination with a driving clutch, a brake and a sprayer, of associated timing mechanism having rotary timer elements acting respectively after predetermined intervals of rotation from starting positions to start and to stop the operation of the sprayer, a curb surrounding the basket of the centrifugal and having a bottom comprising inner and outer annular collecting troughs separated by an intermediate partition, said curb having a circular seat over said outer trough for sealing an annular syrup deflector, an inclined annular syrup deflector overhanging and always overlapping said partition and movable downwardly into sealing engagement with said seat to deflect the centrifugal syrup from the curb into the inner trough and movable upwardly to inactive position in spaced relation to said seat permitting the flow of centrifuged wash liquid from the curb into the outer trough, means for normally retaining the deflector in syrup deflecting position and means actuated by a rotary timer element of said timing mechanism for raising said deflector to inactive position at an interval adjustably related to the starting of the sprayer, whereby centrifuged liquid may be deflected into the inner trough and wash liquid may be collected separately in the outer trough.

3. In centrifugal apparatus, the combination of a driving clutch, a brake, spring actuated means for setting the brake to stop the centrifugal, a shipper mechanism connected with said clutch for engaging and disengaging the same, relatively movable means connected respectively with said shipper mechanism and with said brake setting means for shifting said brake from active to inactive position when the shipper mechanism is moved to engage the driving clutch, and means rendered operative upon such shifting of the brake to inactive position for releasably holding it there against the force of the brake setting means, whereby said shifting means are then relatively movable so that the shipper mechanism then may be moved independently to clutch-disengaging position while the brake is held at inactive position.

4. In centrifugal apparatus, the combination of a driving clutch, a brake, means including a spring and a rotative sleeve actuated by said spring for setting the brake to stop the centrifugal, means including a clutch actuating shipper shaft operatively connected with said sleeve when turned to clutch energizing position to cause rotation of said sleeve against said spring to brake inactive position, a detent for retaining the brake and said sleeve at brake inactive position against the tension of said spring, said operative connection constructed so that said shipper shaft is movable to and from clutch energizing position while the brake setting sleeve is held at inactive position.

5. The combination with a suspended centrifugal basket, of a surrounding curb whose bottom comprises inner and outer annular collecting troughs, a vertically movable inwardly inclined deflector ring arranged below the level of the basket over the outer trough to overhang and always overlap an annular partition between the two troughs and adapted when lowered to rest upon an annular seat on the curb partly overhanging the outer trough and thereby to deflect into the inner trough centrifuged liquor flowing down the inside of the curb, a sprayer to spray wash fluid against the contents of the centrifugal, automatic timing means including a plurality of progressive timing elements interconnected to act respectively after predetermined periods of operation of the centrifugal, means responsive to the action of one of said timing elements to start the sprayer, and means responsive to the action of another of said timing elements for lifting the deflector to inactive position at which the deflector is spaced away from said seat to allow the centrifuged wash liquid to flow from the curb into the outer trough.

6. In a centrifugal apparatus the combination of a centrifugal basket having a foraminous peripheral wall, a surrounding casing for receiving and directing downward the centrifugally expelled liquid whose lower portion contains separate annular collecting conduits for such liquid divided by a common annular partition, a sprayer for directing wash liquid against the contents of the basket, an inclined liquid deflector ring located below the level of the basket and adapted to rest upon an inwardly projecting annular ledge of the curb in sealing relation thereto to deflect liquid to the inner conduit, and means for lifting the deflector ring from the ledge to inactive position thereby permitting liquid to flow down the inside of the curb into the outer conduit, an inner portion of said ring having an annular extension always overlapping the side of said partition that leads into said inner conduit, in both the deflecting and the inactive positions of said ring, so that liquid may not pass from said ring into said outer trough.

7. In a centrifugal apparatus the combination with a centrifugal basket having a foraminous cylindrical wall, a surrounding curb provided with conduits for collecting centrifugally expelled liquid from said curb, an annular ledge adjacent the inside of said curb below the openings in the basket wall and above said conduits, an annular deflector movable from a position in which it is supported by said ledge and deflects liquid from the curb into one of said conduits to a position away from the ledge permitting flow of liquid from the curb into another of said conduits, means for moving said deflector away from said ledge, and a jet pipe arranged below said ledge to deliver fluid jets against said deflector to weaken adhesion of the deflector to its supporting ledge to prevent sticking.

8. In centrifugal apparatus, the combination of a driving clutch, a self-setting brake, a sprayer, associated timing mechanism acting at predetermined but variable intervals after starting to start and to stop the sprayer and to open the clutch and release the self-setting brake to stop the centrifugal, manually operable means for moving the brake to "off" position, means for releasably holding the brake in "off" position, means operable manually independently of the timer mechanism for temporarily energizing the clutch while the brake is held in "off" position, thereby prolonging the revolution of the centrifugal, and means operable by hand independently of the timer for opening and closing the sprayer while rotation of the centrifugal is thus prolonged.

9. In a centrifugal apparatus the combination with a centrifugal basket having spaced discharge openings through its peripheral wall for the escape of the centrifugally expelled liquid from the basket, of a surrounding casing for receiving the centrifugally expelled liquid, said casing having a bottom comprising inner and outer annular troughs separated by an annular partition, an annular ledge projecting from the inside of the casing wall above said troughs, a vertically movable inclined deflector ring arranged to be seated upon said ledge and deflect liquid flowing down said ledge into the inner of said collecting troughs, and means for raising the deflector ring from the ledge to permit liquid to flow from the casing wall into the outer trough, an inner portion of said ring extending at least to the top of said partition in every position of movement of said ring so as to maintain a complete liquid-conducting surface from said ring into said inner trough in every position of said ring.

10. Centrifugal apparatus comprising, in combination, a curb for enclosing a perforated centrifugal basket, separate inner and outer annular troughs adjacent said curb for collecting liquid flowing down the inner wall of the curb, said troughs having a common annular dividing partition, an annular deflector ring located inwardly from said curb and extending inwardly to a point overlying said inner trough, annular seating means for said deflector on said curb, said deflector being adapted in one position to rest upon and seal with said seating means to divert liquid flowing down the curb into the inner trough, and means for separating said deflector from said seating means to permit liquid flowing down the curb to pass into said outer trough, said deflector having annular means extending from its inner portion in overlapping relation to the top of said partition in every position of said deflector to prevent passage of liquid between the partition and the deflector.

11. In a centrifugal apparatus of the filtering type for sugar manufacture, including a perforate basket and a stationary curb surrounding the basket and having a bottom and a side wall to receive syrup expelled from the perforations of the basket, two annular troughs having an annular dividing partition and located in said bottom below said basket to receive and collect syrup flowing down said wall at different stages of centrifugal operation, a normally uninterrupted syrup-conducting surface extending from said side wall over the trough nearer thereto to the trough farther therefrom to direct and conduct such syrup into said farther trough, said surface defined by a circular seat member on said wall and a movable annular syrup deflector normally resting in a seated position of sealing engagement with said seat member and extending therefrom over said nearer trough to overlap said partition on the side thereof leading into said farther trough, said deflector having a peripheral portion near to said wall operative in said seated position to engage and seal with said seat member and having farther from said wall an annular portion extending to said partition in every position of movement of said deflector so that syrup may not pass between the partition and the deflector, and means for shifting said annular deflector to an unseated position, at which it is spaced from said seat member and yet extends as aforesaid to said partition, to provide a single continuous annular passage through said surface into said nearer trough between said peripheral portion and said seat member, through which passage syrup flowing down said wall will pass into said nearer trough.

12. In a centrifugal apparatus of the filtering type for sugar manufacture, including a perforate basket and a stationary curb surrounding the basket and having a bottom and a side wall to receive syrup expelled from the perforations of the basket, two annular troughs having an annular dividing partition and located in said bottom below said basket to receive and collect syrup flowing down said wall at different stages of centrifugal operation, a normally uninterrupted syrup-conducting surface extending from said side wall over the trough nearer thereto to the trough farther therefrom to direct and conduct such syrup into said farther trough, said surface defined by a circular seat member on said wall and a movable annular syrup deflector normally resting in a seated position of sealing engagement with said seat member and extending therefrom over said nearer trough to overlap said partition on the side thereof leading into said farther trough, said deflector having a peripheral portion near to said wall operative in said seated position to engage and seal with said seat member and having a portion farther from said wall overlapping said partition as aforesaid in every position of movement of said deflector so that syrup may not pass between the partition and the deflector, and means for shifting said annular deflector to an unseated position, at which it is spaced from said seat and yet maintains said overlapping relation with said partition, to provide a single continuous annular passage through said surface into said nearer trough between said peripheral portion and said seat member, through which passage syrup flowing down said wall will pass into said nearer trough, said annular deflector being inclined to an angle to the path of rotation of said basket so as to enhance the flow of syrup therefrom into said farther trough.

13. Centrifugal apparatus comprising, in combination, a curb for enclosing a perforate centrifugal basket and having a cylindrical side wall and a bottom, an annular partition dividing in said bottom separate inner and outer annular troughs for collecting separately liquids expelled from the basket at different stages of each cycle of centrifugal operation, said wall having an annular member over said outer trough providing a circular sealing seat for an annular deflector, a movable annular deflector disposed adjacent said member and extending inwardly therefrom to overlie said partition of the inner trough, said deflector having an outer periphery formed to engage and produce a substantially fluid-tight seal with said seat and having an inner portion extending at least to the top portion of said partition in every position of movement of said deflector so as always to prevent passage of liquid between said deflector and said partition into said outer trough, said deflector being movable to an unseated position away from said member at which liquid flowing down said side wall passes between said deflector and said member into said outer trough and movable back to a seated position at which said outer periphery engages and seals with said seat and liquid flowing down said wall is conducted over said deflector to said inner trough, and mechanism extending into the bottom of said curb to engage said deflector and operable to move said deflector to said unseated position and said seated position, respectively, at appropriate intervals in the successive cycles of centrifugal operation.

14. Centrifugal apparatus comprising, in combination, a curb for enclosing a perforate centrifugal basket and having a cylindrical side wall and a bottom, an annular partition dividing in said bottom separate inner and outer annular troughs for collecting separately liquids expelled from the basket at different stages of each cycle of centrifugal operation, said wall having an annular member over said outer trough providing a circular sealing seat for an annular deflector, a movable annular deflector disposed adjacent said member and extending inwardly therefrom to overlie said partition of the inner trough, said deflector having an outer periphery formed to engage and produce a substantially fluid-tight seal with said seat and having an inner portion comprising annularly spaced depending flanges straddling and overlapping the top portion of said partition in every position of movement of said deflector so as to maintain at all times a substantially uninterrupted liquid-conducting surface from the deflector into the inner trough, said deflector being movable to an unseated position away from said member at which liquid flowing down said side wall passes between said deflector and said member into said outer trough and movable back to a seated position at which said outer periphery engages and seals with said seat and liquid flowing down said wall is conducted over said deflector to said inner trough, and mechanism extending into the bottom of said curb to engage said deflector and operable to move said deflector to said unseated position and said seated position, respectively, at appropriate intervals in the successive cycles of centrifugal operation.

15. Centrifugal apparatus comprising, in combination, a curb for enclosing a perforate centrifugal basket and having a cylindrical side wall and a bottom, an annular partition dividing in said bottom separate inner and outer annular troughs for collecting separately liquids expelled from the basket at different stages of each cycle of centrifugal operation, said wall having an annular member over said outer trough providing a circular sealing seat for an annular deflector, said member having a circular groove therein and a circular sealing member held in said groove constituting said seat, a movable annular deflector disposed adjacent said member and extending inwardly therefrom to overlie said partition of the inner trough, said deflector having an outer periphery formed to engage and produce a substantially fluid-tight seal with said seat and having an inner portion extending at least to the top portion of said partition in every position of movement of said deflector so as to prevent at all times the passage of liquid from said deflector between it and said partition into said outer trough, said deflector being movable to an unseated position away from said member at which liquid flowing down said side wall passes between said deflector and said member into said outer trough and movable back to a seated position at which said outer periphery engages and seals with said seat and liquid flowing down said wall is conducted over said deflector to said inner trough, and mechanism extending into the bottom of said curb to engage said deflector and operable to move said deflector to said unseated position and said seated position, respectively, at appropriate intervals in the successive cycles of centrifugal operation.

16. In a centrifugal machine for purging, washing and drying sugar or the like, the combination with a perforate centrifugal basket mounted on a basket-carrying shaft, of a sprayer for delivering washing fluid onto the contents of the basket and having a valve for controlling the flow of such fluid, driving means for rotating the shaft and basket, brake means for stopping the same, manually operated means connected with said brake means and said driving means for moving the brake to "off" position and for actuating said driving means so as to start each operating cycle of the machine, automatic control means including a plurality of progressive timer elements and a timer detent in the path of each element and movable thereby, some of said detents having actuating connections with said sprayer valve and with said brake means and said driving means for terminating the purging, washing and drying periods successively at timed intervals and causing the stopping of the basket in each of the successive operating cycles, a stationary curb surrounding the basket and having a bottom comprising inner and outer annular syrup-collecting troughs separated by an intermediate partition, a circular seat on the curb over said outer trough for sealing a syrup deflector, a movable inclined syrup deflecting ring having an inner portion overlapping the top portion of said partition on the side thereof that leads into said inner trough in every position of movement of said ring and having an outer periphery formed to engage and seal with said seat, actuating means extending into said bottom in engagement with said ring to move the same to an unseated position at which said outer periphery is spaced from said seat to provide an annular passage for the flow of liquid from the curb into said outer trough and to a seated position at which said outer periphery engages and seals with said seat and liquid flowing down the curb is deflected over the ring into said inner trough, timing means including one of the aforesaid timer elements having its cooperating detent connected with said actuating means for moving the same to move said ring to its unseated position in adjustably timed relation to the start of the washing in each operating cycle, and coacting connections on said actuating means and said manually operated means for moving said actuating means to move said ring to its seated position when the brake is moved to "off" position at the end of each cycle.

17. In centrifugal apparatus as described in claim 16, manually operated means also connected with said sprayer valve and operable independently of said automatic control means for actuating the sprayer valve to permit a washing to clean the basket between the end of one cycle and the start of the succeeding operating cycle of the machine.

18. In centrifugal apparatus for purging, washing and drying sugar or the like, the combination with a perforate centrifugal basket mounted on a basket-carrying shaft, of a curb surrounding the basket and having a bottom comprising inner and outer annular syrup-collecting troughs separated by an intermediate partition, a circular seat on the curb over said outer trough, a movable syrup deflecting ring having an inner portion extending at least to the top portion of said partition in every position of movement of said ring so that syrup may not pass between the partition and the ring, and having an outer periphery formed to engage and seal with said seat, actuating means extending into said bottom in engagement with said ring to move the ring to an unseated position at which said outer periphery is spaced from said seat to provide an annular passage for the flow of syrup from the curb into said outer trough and to a seated position at which said outer periphery engages and seals with said seat and syrup flowing down the curb is deflected over the ring into said inner trough, a sprayer having a normally closed valve and adapted to direct washing fluid into the basket when said valve is open, driving means connected with said shaft for rotating the basket, means operable manually and connected with said driving means for activating and for inactivating the same, brake means for stopping rotation of the basket, manually operable means for unsetting the brake, means interconnecting the drive inactivating means with said brake means so that the driving means is rendered inactive upon the setting of the brake, timing means comprising a plurality of coordinated progressive timing elements each comprising at least one movable finger, a detent normally in the path of movement of each finger and movable by such finger and means for advancing each finger slowly through a path between a starting position occupied by the finger when the element is inactive and a timing-out position at which the finger engages and moves its cooperating detent, means operable to start the operation of said timing means when said driving means is rendered active to start an operation of purging, washing and drying sugar or the like in said basket, connections between said sprayer valve and the detent in the path of one of said fingers whereby said one finger at its timing out position opens said valve to start washing the contents of said basket after a predetermined period of purging, connections between said actuating means and the detent in the path of a second of said fingers whereby said second finger at its timing out position causes movement of said syrup deflecting ring to said unseated position at an interval predetermined in relation to the start of washing, connections between said sprayer valve and the detent in the path of a third of said fingers whereby said third finger at its timing out position closes said valve to stop the washing after a predetermined period of washing, connections between said brake means and the detent in the path of a fourth of said fingers whereby said fourth finger at its timing out position causes the brake to become set after a predetermined period of drying, and connections between the second-recited manually operable means aforesaid and said actuating means whereby the syrup deflecting ring is moved to said seated position upon the movement of said brake to unset position.

EUGENE ROBERTS.